July 3, 1962  H. F. WILLEMS  3,042,046
SUN BATHING APPARATUS
Filed Sept. 22, 1960
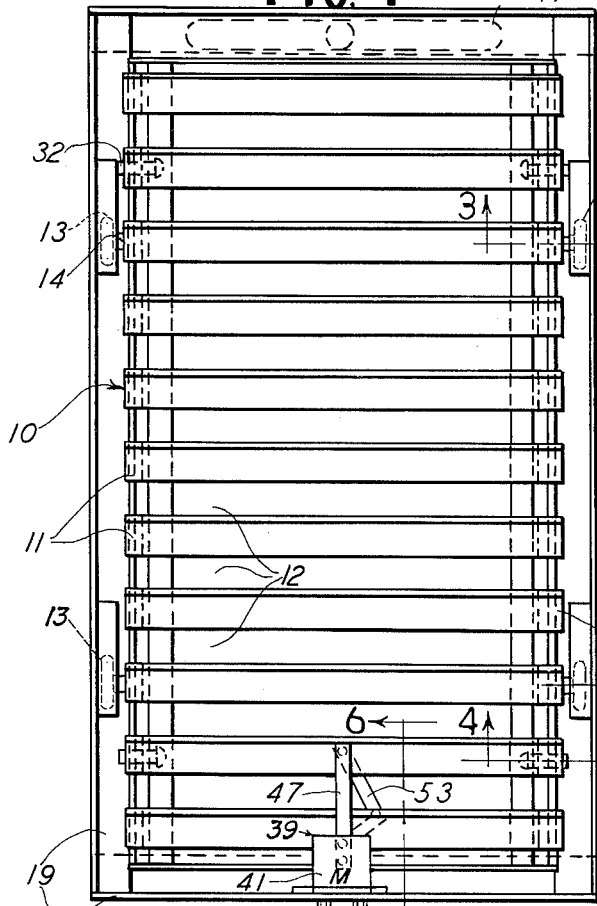
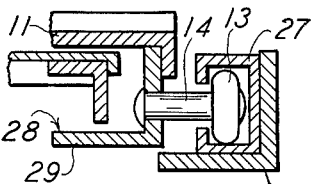
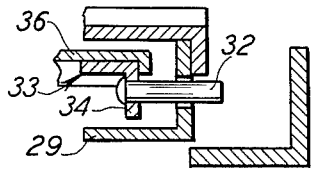
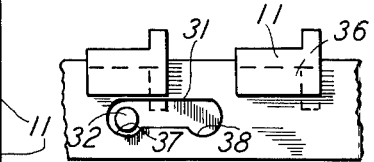
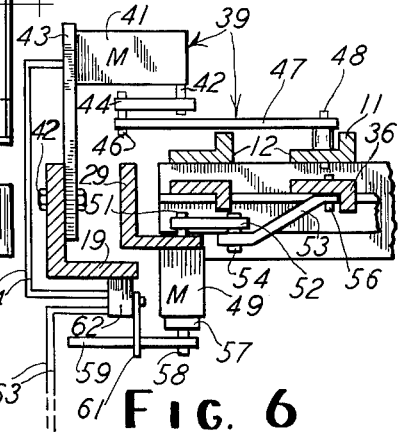
INVENTOR:
HAROLD F. WILLEMS
BY: Arthur J. Hansmann
ATTORNEY

United States Patent Office 3,042,046
Patented July 3, 1962

3,042,046
SUN BATHING APPARATUS
Harold F. Willems, 2116 Washington Road,
Kenosha, Wis.
Filed Sept. 22, 1960, Ser. No. 57,669
1 Claim. (Cl. 128—372)

This invention relates to a method and apparatus for exposing a subject to a controlled quantity of electromagnetic radiation. More specifically, it has been found to have particular application in controlling the rays emitted by the sun for the purpose of interrupting the rays during the process of sun bathing. By the employment of both the method and apparatus described hereinafter, a sun bather can receive a uniform tan and thereby avoid over-exposure to the rays of the sun and the consequent sun-burning and the bather can do this in an initial and only exposure to the sun.

Accordingly, it is an object of this invention to provide a method and apparatus for controlling or interrupting the quantity of electro-magnetic radiation emitted from a source and directed at a subject. In accomplishing this object in a sun bathing process, it is the object of the invention to receive a uniform tan and thereby avoid being burned by the sun or other source of radiation.

Another object of this invention is to provide a method and apparatus for exposing a subject to a selected amount of electro-magnetic radiation in both the quantity of radiation directed at the subject at a given time and in the length of time during which the subject is exposed to the radiation. In accomplishing this particular object apparatus is provided whereby the area of the subject exposed to the radiation is controlled by means of the apparatus, and the apparatus is operative to permit the radiation to pass therebeyond for only a selected length of time.

Still other objects include a provision of both method and apparatus which are convenient and simple to employ, and the apparatus is inexpensive and yet sturdy in structure, therefore adaptable to use out-of-doors and it is also quiet in its operation, and it is relatively inexpensive.

Other objects and advantages will become apparent upon reading the following description in conjunction with the accompanying drawings wherein:

FIG. 1 is a top plan view showing a preferred embodiment of this invention.

FIG. 2 is an end view showing a fragment of that shown in FIG. 1 and having parts removed and having a piece of lawn furniture or the like shown therewith.

FIG. 3 is an enlarged sectional view taken on the line 3—3 of FIG. 1.

FIG. 4 is an enlarged sectional view taken on the line 4—4 of FIG. 1.

FIG. 5 is a side elevational view of an enlarged fragment of that shown in FIG. 1.

FIG. 6 is an enlarged sectional view taken on the line 6—6 of FIG. 1.

The same reference numerals refer to the same parts throughout the several views.

The preferred and shown embodiment of this invention incorporates the general provision of a shield 10 which includes a plurality of permanently spaced-apart slats 11 having interposed openings 12. The shield 10 is also shown to be provided with a wheel or roller 13 attached to the shield through an axle 14 and located at the four positions shown in FIG. 1, such that the shield 10 can be reciprocated on a main frame 16 which is permanently supported on a stand or legs 17. Thus, it will be understood that the shield 10 can be moved back and forth in a horizontal plane and of course the rays from the sun or a similar electro-magnetic source will be directed downwardly upon the shield 10 so that the solid portions or slats 11 of the shield 10 will interrupt the rays while the interposed openings 12 will permit the rays to pass beyond the shield 10 and thus be directed at a person reclining on the lawn furniture or the like 18. In further general description, it will therefore be understood that the shield 10 will cast stripes of shadow across the body of the person on the furniture 18 and the stripes of shadow will of course be moving back and forth over the person's body so that only approximately half of the body will be exposed to sunshine passing through the opening 12, and it has been discovered that by virtue of this alternate shading and exposing, a highly desirable uniform tan is obtained on the body without the usual sun-burning caused by initial exposure to the sun.

It should also be understood that both this method and apparatus could of course be employed with any artificial source of emitting electro-magnetic radiation for the purpose of sun-bathing or any health or other useful purpose, and it could also be employed to shield other subjects such as plants of the agricultural type and other classes of subjects. Having thus described the general method and apparatus, the following will describe the necessary details of the method and apparatus as disclosed herein. Note that slats 11 are wider than openings 12.

The stationary and main frame 16 is shown to consist of four angle irons 19 which are of course suitably secured together to form a substantially horizontal track or support for the movable shield 10. Also FIG. 2 and an upper portion of FIG. 1 show that the stand or leg 17 is preferably adjustable as it consists of two telescoping pieces 21 and 22 which have openings 23 therein so that a pin indicated 24 can pass through any aligned two of the openings 23 in the respective parts 21 and 22 to secure the telescoping pieces in selected extended positions. This, of course permits locating the main frame 16 at a selected elevation above the lower support 26 which can of course rest upon the ground or the floor. It will also be understood that a stand 17 is provided at each end of the main frame 16, though for convenience of drawing and additional clarity, only the upper end is shown to have the stand 17 in FIG. 1.

The frame 16 is also provided with four guides or C-channels 27 which are attached to the side angles 19 in any suitable manner to be permanently located thereon, and they therefore provide a guide for the rollers or wheels 13 in the reciprocatory movement of the shield 10.

The shield 10 is shown to be composed of a rectangular frame 28 made of four angle irons 29 suitably secured together in a rigid rectangular frame to support the slats 11 which are also of course suitably in a fixed position on the side angles 29 of the frame 28. FIGS. 1 and 4 and 5 show the side angles 29 to be provided with a slot 31 which receives a pin 32 extending from a third rectangular frame 33 which is composed of four angle irons 34 suitably secured together in a rigid frame 33 and with the side angle irons 34 having a second set of slats or solid members 36 rigidly attached thereto to extend across the apparatus as shown in FIG. 1. Thus, the frame 33 is supported on the frame 28 by means of the pin 32 entering the slot 31 as described. As shown in FIGS. 1 and 5 and 6 particularly, the slats 36 and disposed directly below the slats 11 and thus the rays directed at the shield 10 are still permitted to pass through the openings 12 and to continue on to the subject disposed below the shield 10, as mentioned. Also, the frames 28 and 33 are releasably retained together in a set position as shown by means of the pin 32 engaging a notch or depression 37 at one end of the slot 31 so that upon reciprocation of the shield 10 and its frame 28, the frame 33 will reciprocate in identical manner and stroke. However, the frame 33 can be displaced with respect to the frame 28 simply by moving the frame 33 so that the pin 32 moves to the notch 38 at the opposite end of the slot 31 and in this position, the frame 32 is again releasably retained with respect to the frame 28, however, at this time it will also be understood that now the slats 36 are aligned with the openings 12 and the electro-magnetic rays cannot then pass to the subject below the shield 10. This position of the frame 33 is achieved when it is desired to cut out all radiation directed at the apparatus and that particular condition will be explained later.

FIGS. 1 and 6 show a powered means 39 for reciprocating the shield 10 and of course its frame 28 in a desired frequency for the purpose mentioned. It has been found that for a sun bathing purpose, the mechanism 39 can effectively be operated at say eight or ten strokes per minute. An electric motor 41 is preferably provided to serve as the power source of the means 39, and it is shown to be attached to one of the angles 19 by means of the bolt 42 and an extension plate 43 which in turn supports the motor 41 in a fixed position. A motor shaft 42 depends below the motor 41 and has a first link 44 attached to the shaft 42 to constantly rotate with the shaft and a pin 46 is connected to the link 44 to attach the latter to a second link or pitman 47 which in turn connects to a pin 48 extending to the slat 11. Thus, it will be understood that upon operation of the motor 41 and consequent rotation of its shaft 42, the link 44 will rotate to rotate the pin 46 about the shaft 42 and thereby reciprocate the pin 48 through the link or pitman 47 and of course also reciprocate the slats 11 or the entire shield 10.

After a desired time of exposure to radiation, the lower set of slats 36 can be displaced from the positions shown in FIG. 6 to the positions of alignment with the opening 12 so that all radiation passing to the shield 10 will be interrupted. To accomplish the entire closure of the apparatus as mentioned, another means or motor 49 is shown suitably attached to the angle 29 of the frame 28 to reciprocate therewith and to have its shaft 51 project above the motor 49 as shown. Here, also, a link 52 is attached to the shaft 51 to rotate with the latter and the link 52 is attached to a second link 53 by means of a pin 54 and the second link 53 is in turn attached to the slat 36 by means of a second pin 56. Thus, with this linkage as shown in FIGS. 1 and 6, and with the motor 49 being of any conventional type, such as a pin motor which operates after a pre-set time, such as may be set by a mechanism 57 indicated to be a time dial, the shaft 51 of the motor 49 will rotate to rotate the links 52 and 53 and thereby displace the frame 33. Also, after the preselected amount of time as set on the dial 57 of the motor 49 is expired, the motor shaft 58 will rotate to in turn rotate a link 59 connected to the shaft 58 so that the link 59 engages a switch arm 61 rotatably mounted on an electric switch 62. The latter has a conventional incoming source of electric power through the wires 63 and electric wires 64 extend from the switch 62 to the motor 41 so that upon actuation of the switch arm 61, the electric power to the motor power 41 is interrupted so that reciprocation of the shield 10 is likewise interrupted. Thus, the shield 10 has stopped its reciprocation and the shield 33 has been displaced to completely block out the radiation described. This permits the sun bather to receive the radiation through the openings 12 for the length of time selected by the dial 57 and upon termination of that time, the apparatus entirely closes the shields so that no rays pass therebeyond and the continued resting can be had without the danger of over-exposure to the rays.

Note that the stroke on the shield 10 is shown to be of a length equal to the combined width of a slat 11 and opening 12 so that best uniformity of exposure will be obtained. Also, a pivot bolt 66 is disposed at each end of the frame 16 and pivotally connects the end angles to the stands 17 so that the entire frame 16 can be tilted about the axis of the shown bolt 66 to place the shield 10 transverse to the rays of the source.

While a specific embodiment of this invention has been shown and described and a specific method has also been described, it will be obvious that certain changes can be made in the embodiment and the method and the scope of this invention should therefore be limited only by the scope of the appended claim.

I claim:

Apparatus for dividing sun rays on a sun bather by forming slow moving shadows to give the bather's body cells rest periods, comprising a stationary frame, means attached to said frame and including adjustable supports for disposing said frame in at least a substantially horizontal position at a selected elevation, a shield mounted on said frame and having first solid portions uniformly spaced apart a selected distance and being of a material capable of intercepting said rays and having other portions interposed between said solid portions and being capable of transmitting said rays therethrough, rollers attached to said shield for reciprocably mounting the latter on said frame, an electric motor attached to said shield and having a connector with a stroke of the length equal to the total length of said distance and one of said solid portions in the direction of said stroke for reciprocating said shield through said stroke on said rollers, additional solid portions of said material being mounted on said shield in a plane parallel to said first solid portions and being movable with said shield and also being movable with respect to said shield, and a timing motor connected to said additional solid portions for moving the latter adjacent said other portions and aligned therewith for intercepting said rays directed at said other portions after a selected period of time, said timing motor including an electrical switch connected to said electric motor for disconnecting the electric power thereto after said period of time has elapsed.

References Cited in the file of this patent

UNITED STATES PATENTS

| | | |
|---|---|---|
| 188,570 | Beidler | Mar. 20, 1877 |
| 2,380,928 | Dueweke | Aug. 7, 1945 |
| 2,607,884 | Dion | Aug. 15, 1952 |